(12) United States Patent
Knappenberger

(10) Patent No.: US 8,230,578 B2
(45) Date of Patent: Jul. 31, 2012

(54) METHOD FOR PRODUCING A WINDING OF AN ELECTRICAL MACHINE

(75) Inventor: Uwe Knappenberger, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 694 days.

(21) Appl. No.: 11/577,015

(22) PCT Filed: Jun. 30, 2006

(86) PCT No.: PCT/EP2006/063750
§ 371 (c)(1),
(2), (4) Date: Apr. 11, 2007

(87) PCT Pub. No.: WO2007/006668
PCT Pub. Date: Jan. 18, 2007

(65) Prior Publication Data
US 2008/0072990 A1    Mar. 27, 2008

(30) Foreign Application Priority Data
Jul. 12, 2005    (DE) .......................... 10 2005 032 478

(51) Int. Cl.
*H02K 15/00* (2006.01)
(52) U.S. Cl. .......................................... 29/596; 310/184
(58) Field of Classification Search ................. 140/92.1; 29/596–598; 310/206, 207
See application file for complete search history.

(56) References Cited

U.S. PATENT DOCUMENTS

| | | | | |
|---|---|---|---|---|
| 4,351,102 A | * | 9/1982 | Grozinger et al. | ............... 29/596 |
| 5,925,959 A | * | 7/1999 | Bai et al. | .................. 310/179 |
| 6,211,593 B1 | * | 4/2001 | Nashiki | ................... 310/156.33 |
| 7,352,097 B2 | | 4/2008 | Fukasaku et al. | |
| 7,726,005 B2 | * | 6/2010 | Stroebel et al. | ................. 29/596 |
| 2002/0046779 A1 | | 4/2002 | Even | |
| 2002/0079774 A1 | | 6/2002 | Tanaka et al. | |
| 2002/0130578 A1 | | 9/2002 | Anma et al. | |
| 2004/0041491 A1 | * | 3/2004 | Gorohata et al. | ............ 310/187 |
| 2004/0119359 A1 | | 6/2004 | Neet | |
| 2004/0261885 A1 | * | 12/2004 | Sadiku | ......................... 140/92.1 |
| 2005/0258703 A1 | * | 11/2005 | Kouda et al. | .................. 310/180 |
| 2006/0012259 A1 | * | 1/2006 | Kerlin | ........................... 310/180 |

FOREIGN PATENT DOCUMENTS

| | | |
|---|---|---|
| DE | 103 06 147 | 8/2004 |
| EP | 1 401 084 | 3/2004 |
| GB | 2 052 884 | 1/1981 |
| JP | 54-105701 | 8/1979 |
| JP | 55-155529 | 12/1980 |
| JP | 6-284614 | 10/1994 |
| JP | 10-42528 | 2/1998 |
| JP | 11-69687 | 3/1999 |
| JP | 2001-309597 | 11/2001 |
| JP | 2005-124363 | 5/2005 |

* cited by examiner

*Primary Examiner* — Minh Trinh
(74) *Attorney, Agent, or Firm* — Michael J. Striker

(57) ABSTRACT

The invention relates to a method for producing at least one winding of an electrical machine that has a plurality of poles, in particular of a motor generator, preferably for a hybrid drive of a motor vehicle, the winding being formed by winding parts connected in parallel and each pole being associated with at least one groove set that is associated with the winding parts and comprises a plurality of grooves which have different circumferential angle positions relative to the associated pole, grooves with the same circumferential angle position forming equivalent grooves and each winding part of the winding being wound with the same number of windings in equivalent grooves. The invention also relates to a corresponding winding.

9 Claims, 4 Drawing Sheets

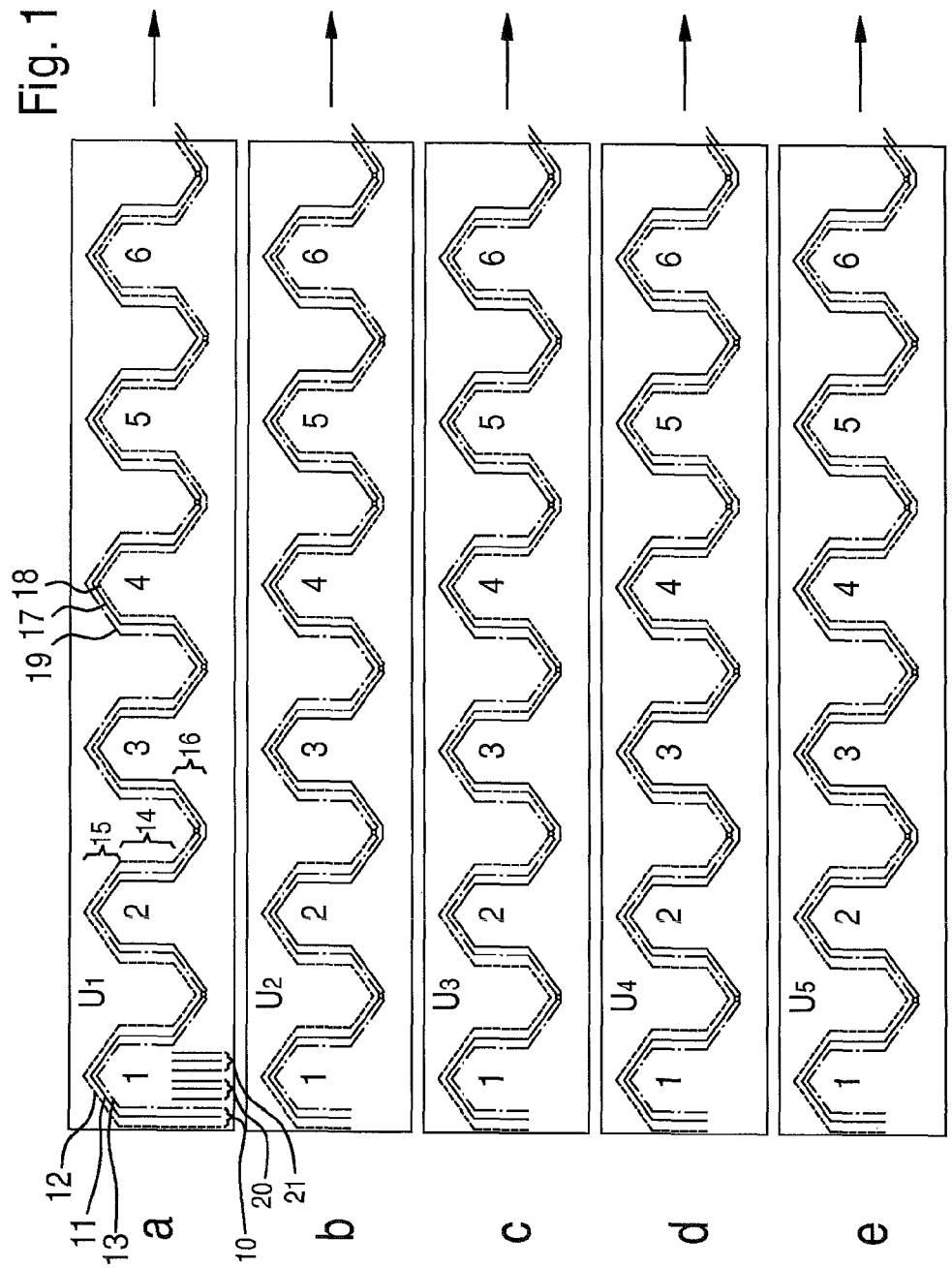

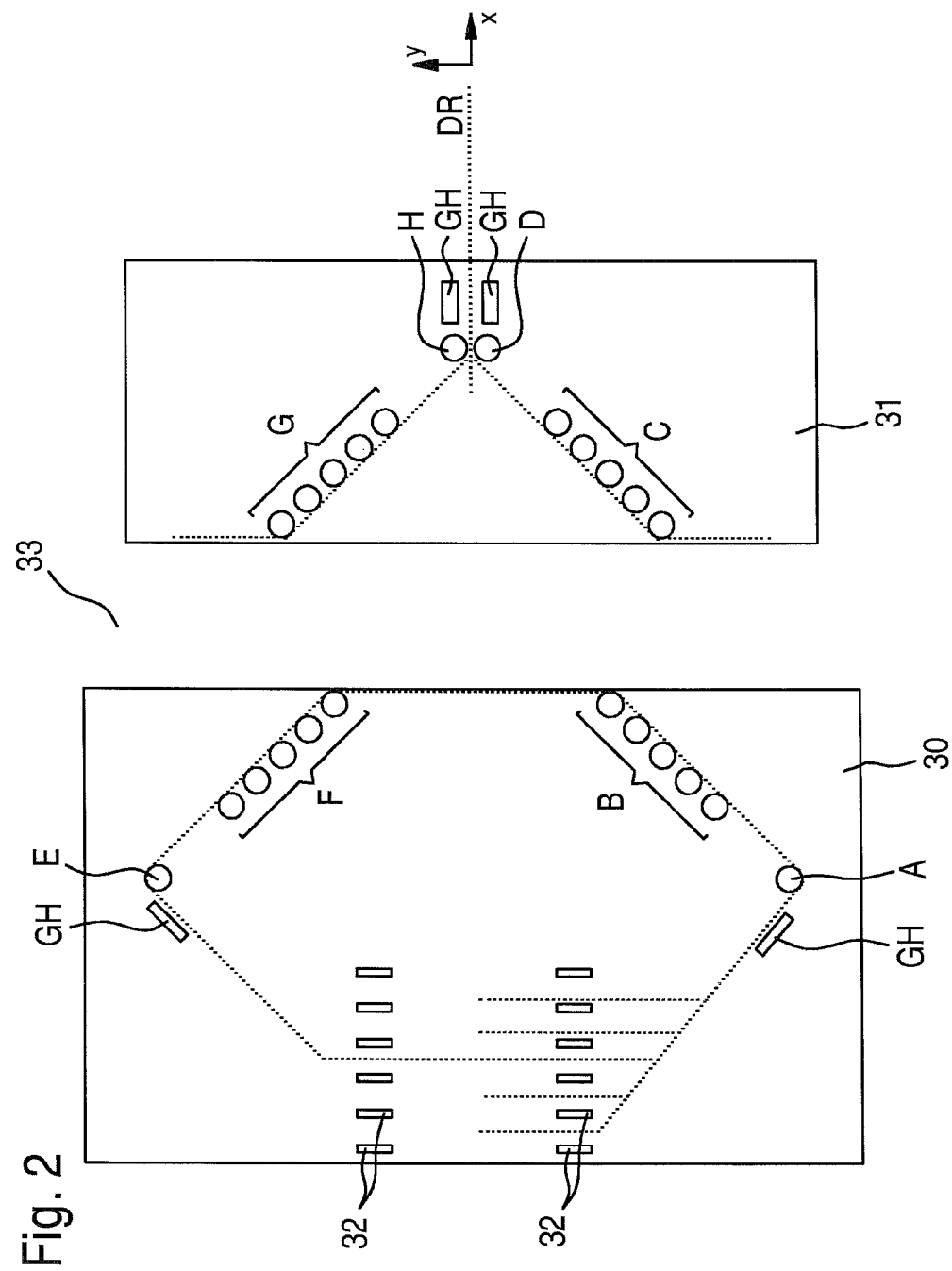

METHOD FOR PRODUCING A WINDING OF AN ELECTRICAL MACHINE

CROSS-REFERENCE TO A RELATED APPLICATION

The invention described and claimed hereinbelow is also described in German Patent Application DE 10 2005 032 478.9 filed on Jul. 12, 2006. This German Patent Application, whose subject matter is incorporated here by reference, provides the basis for a claim of priority of invention under 35 U.S.C. 119(a)-(d).

BACKGROUND OF THE INVENTION

The invention relates to a method for producing at least one winding of an electrical machine that has a plurality of poles, in particular a motor-generator, preferably for a hybrid drive of a motor vehicle.

Winding a winding of an electrical machine by hand is time-consuming and requires high qualifications. In machine winding, the winding wire can be processed only up to a diameter that can still be handled by machine without causing damage, particularly insulation damage. In automated winding production, an electrical machine with the best technical specifications should also be achieved.

SUMMARY OF THE INVENTION

The method on which the invention is based for producing at least one winding of an electrical machine that has a plurality of poles has the advantage that in either manual or machine production, good manipulability of the winding wire of the winding exists, and excellent electrical and electromagnetic values are achieved. The winding is formed by parallel-connected winding parts, and for instance three parallel-connected winding parts per phase of the electrical machine may be provided. In a three-phase electrical machine, there are accordingly nine winding parts. Each pole is assigned at least one motor-generator, which is associated with the winding parts and has a plurality of slots each having different circumferential angle positions with regard to the associated pole; slots with the same circumferential angle position form equivalent slots. Because each winding part of the winding is wound with an equal number of windings in equivalent slots, there are no voltage differences, or as good as none, in the winding parts to be closed parallel to one another; that is, the occurrence of circular currents is prevented or essentially prevented, so that excellent electrical and electromagnetic values are attained. Because of the parallel-connected winding parts, a winding wire with a suitable diameter can be used, which can be manipulated very well either manually or by machine or both. For instance, if one considers a winding, formed of three parallel-connected winding strands in the region of a pole, the winding wire of one of the winding parts, for instance in an electrical machine embodied as a generator whose stator is to be wound, is located in a basic pole circumferential angle position; in other words, it rests in a slot that assumes a basic position with regard to the pole embodiment. The winding wire of a different winding part rests in an adjacent slot, which however is in a leading position compared to the slot in the basic pole circumferential angle position with regard to the direction of rotation of the electrical machine; that is, it is a "leading" slot. The winding wire of the further, third winding part, compared to the basic pole circumferential angle position, is in a trailing circumferential angle position, that is, it is located in a slot that trails compared to the first slot mentioned. As a consequence, the electrical voltages that develop in the winding parts have different phase relationships. Compared to the phase relationship of the voltage induced in the middle winding wire, a voltage with a leading phase angle will become established in the winding wire of the "leading slot", while in the "trailing" slot a voltage with a trailing phase angle will become established. Because of the leading phase relationship and the trailing phase relationship, however, these cancel one another out, so that overall in the three winding parts, a balanced phase relationship prevails, as long as care is taken—as already mentioned earlier—to assure that in each winding part of these three winding parts named as an example, the winding is wound with the same number of windings in equivalent slots. The term "equivalent slots" should be understood to mean slots with the same circumferential angle position. Conversely, if in one winding part there are four wires in leading slots, four wires in neutral slots, and four wires in trailing slots, and if the same is provided for each winding part, the overall result is a balanced ratio.

In a refinement of the invention, it is provided that each winding part has equally many windings on a radially identical diameter. This means that within the slots, the various winding wires per winding part have the same radial positions equally often, so that no differences in the individual winding parts occur, since the induced voltage in each winding is varied as a function of the radial position with respect to the center axis of the electrical machine. If—as is preferably provided—the winding parts of the winding are embodied with equal length, or in other words all three winding parts have the same number of windings, then equal voltage values and phase relationships within the winding parts of the winding are attained, so that no compensatory currents, circular currents, and so forth occur. Accordingly, the winding parts can be connected parallel without problems, since no voltage differences and the like occur.

It is advantageous if the embodiment of the equal number of windings is effected in equivalent slots for each winding layer. In this respect, for each winding layer, a corresponding compensation among the winding parts is brought about.

Preferably, a plurality of windings may be embodied, in particular one winding per phase, and this winding then in turn comprises a plurality of winding parts.

In a refinement of the invention, it is provided that the winding and/or the winding parts are prepared flat and then converted to a curved form or wound-up form and finally placed, preferably by machine, into the slots of the electrical machine. Because of the flat preparation of the winding or winding parts, machine production is possible; that is, the winding or in words a plurality of winding parts to be connected parallel, or one winding part, rests flat on a preparation surface, which may also involve winding segments that are subsequently connected in series in order to attain the full length. This winding, or these winding parts or winding segments, are then changed to a curved form or a wound-up form, for instance being wound onto a corresponding winding mandrel. This too is done automatically. Next, the winding mandrel is introduced into the interior of the electrical machine, and then the winding wires are introduced radially into the corresponding slots, meaning in the case of a stator that they are moved radially outward. This too is done by machine, making economical and replicable production possible.

To enable introducing the same number of windings into equivalent slots for each winding part of the winding, it is necessary to make a change from the slot of one rank to a slot of another rank in the respectively associated winding head. This is done by suitable guidance of the wire in the winding head. The result is accordingly crossings or parallel courses in the winding head for the winding wires of the winding parts.

The invention further relates to a winding of an electrical machine that has a plurality of poles, in particular a generator, preferably for a hybrid drive of a motor vehicle, in particular produced by the method described above, wherein the winding is formed by parallel-connected winding parts; and wherein at least one group of slots, associated with the winding parts is associated with each pole, and each generator has a plurality of slots that have different circumferential angle positions with respect to the associated pole; wherein slots with the same circumferential angle position form equivalent slots; and wherein each winding part of the winding has equally many windings in equivalent slots.

BRIEF DESCRIPTION OF THE DRAWINGS

The drawing illustrates the invention; specifically:
FIG. 1 shows a winding diagram;
FIG. 2 shows a bending tool.

DESCRIPTION OF THE PREFERRED EMBODIMENTS

Figure 3A:
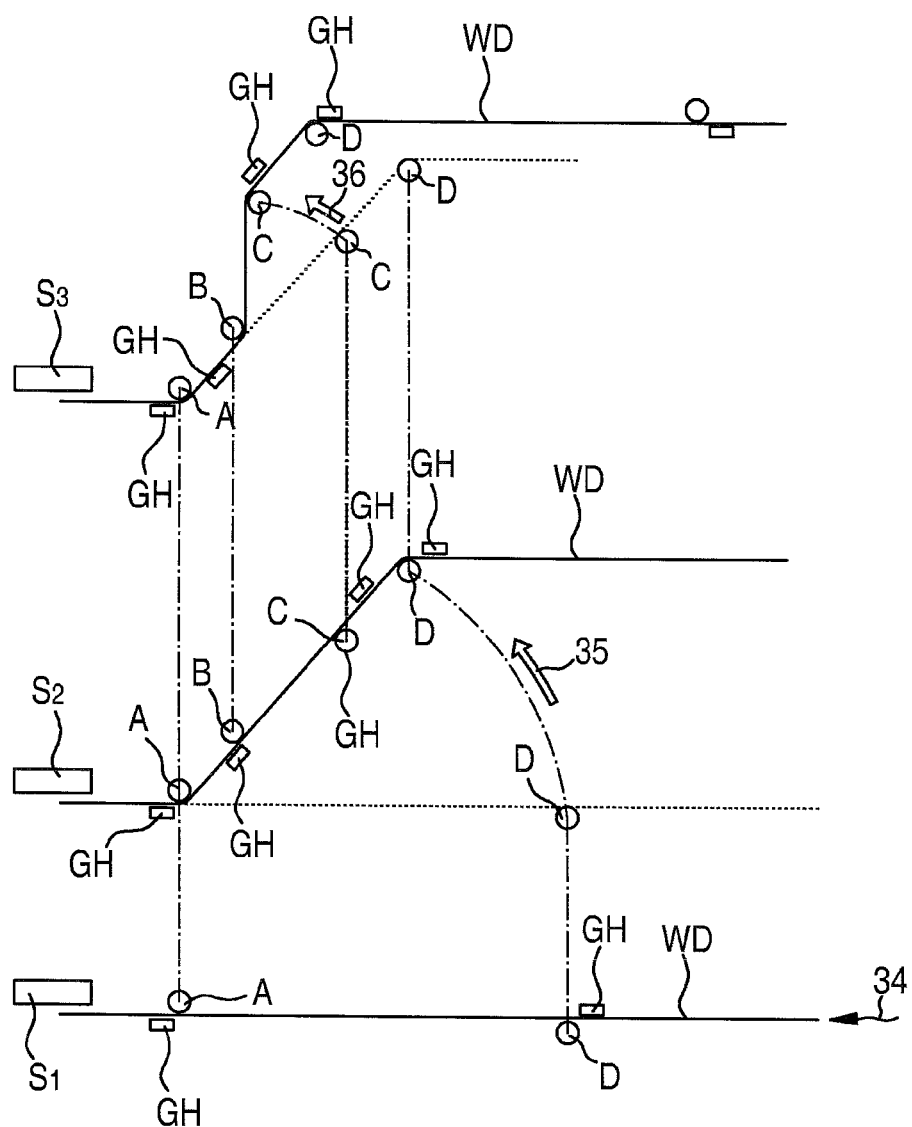
FIGS. 3a, b are a bending sequence diagram.
Figure 3B:
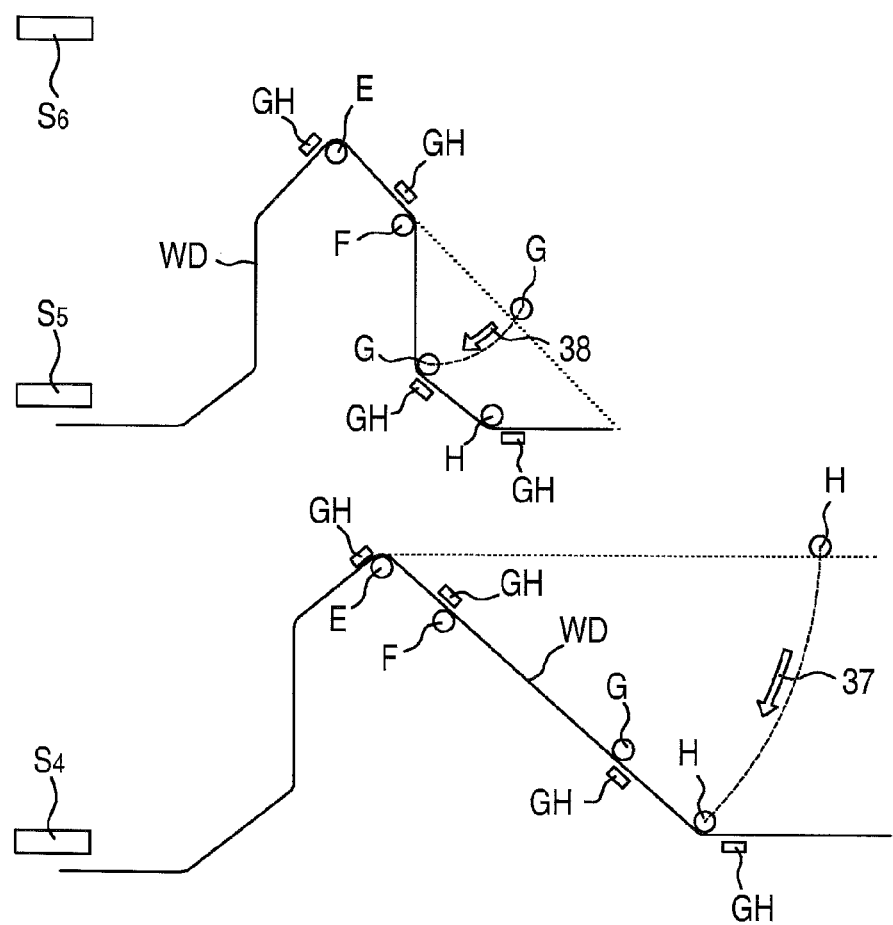

FIG. 1 shows a winding diagram of an electrical machine, embodied as a generator, with six poles and three phases. In the winding diagram, the winding of a phase that is formed by three winding parts to be connected parallel is shown. The arrangement is made such that the winding segment marked a is adjoined by the winding segment b; the winding segment b̄ is adjoined by the winding segment c̄; the winding segment c is adjoined by the winding segment d; and the winding segment d is adjoined by the winding segment e, and each winding segment engages all six poles 1 through 6. The winding segments a through e bring about five windings per pole; these are then adjoined by another five windings, not shown in the winding diagram, but wound by the same principle.

The winding shown in the winding diagram of a phase 10 is composed of three winding parts 11, 12 and 13 to be connected parallel; the winding wire of the winding part 11 is shown by a solid line, the winding wire of the winding part 12 by a dashed line, and the winding wire of the winding part 13 by a dot-dashed line. In the region of the pole 1 through 6, one pole zone 14 each is associated with the winding parts 11, 12, 13, and on the far side of the corresponding pole 1 through 6, winding head zones 15 and 16 are associated with them. The individual circumferences for the winding segments a through e are marked $U_1$ through $U_5$.

Below, for the winding segment a, that is, for the first circumference ($U_1$), the applicable position of the winding wire 17 of the winding part 11, the winding wire 18 of the winding part 12, and the winding wire 19 of the winding part 13 will be addressed. The gaps that develop in the winding diagram each represent the location of one slot, and the poles 1 through 6 shown there apply to the phase 10. Since the electrical machine is a three-phase machine, the further two phases 20 and 21 are shown schematically only in the region of the pole 1 of the winding segment, but not shown in accordance with the course of their parallel-connected winding parts, in order to keep the drawing simple. However, the following remarks on phase 10 apply accordingly to phases 20 and 21.

With regard to the pole 1, the winding wire 17 of the winding part 11 in the winding segment a has a neutral position in the pole zone 14 located on the left of the pole 1. This is a basic pole circumferential angle position. By comparison, the winding wire 18 occupies an (electrically) leading position, and the winding wire 19 occupies a corresponding (electrically) trailing position in the aforementioned pole zone 14. The winding wires 17 through 19 extend in the winding head zone 15 without crossing, so that on the right of the pole 1 in the pole zone 14, the following situation results: The winding wire 17 represented by a solid line remains in a neutral position because of its central position; that is, once again it is in a basic pole circumferential angle position. By comparison, the winding wire 18 trails and the winding wire 19 leads. In the ensuing winding head zone 16, a crossing occurs between the winding wires 17 and 19, and as a consequence on the left of the pole 2, the winding wire 19 is in a neutral position relative to the phase relationship; the winding wire 18 is in a leading position, and the winding wire 17 is in a trailing position. In the winding head zone 15 of the pole 2, no crossing of the winding wires 17 through 19 takes place, so that on the right of the pole 2 in the pole zone 14, the winding wire 19 maintains its neutral position; the winding wire 17 is in a leading position, and the winding wire 18 is in a trailing position. In the winding head zone 16 that is located between the poles 2 and 3, crossing of the winding wires 18 and 19 results. In the pole zone 14 on the left of the pole 3, the winding wire 18 is in a neutral position, the winding wire 19 is in a leading position, and the winding wire 17, because of the respective corresponding slot position, is in a trailing position. In the winding head zone 15 of the pole 3, the winding wires 17 through 19 do not cross. To the right of the pole 3, the winding wire 18 is in a neutral position, the winding wire 17 is in a leading position, and the winding wire 19 is in a trailing position. In the winding head zone 16 located between the poles 3 and 4, crossing of the winding wires 17 and 18 occurs. To the left of the pole 4, the winding wire 17 is in a neutral position, the winding wire 19 is in a leading position, and the winding wire 18 is in a trailing position. In the following winding head zone 15 of the pole 4, no crossing of the winding wires 17 through 19 takes place. To the right of the pole 4, the winding wire 17 is in a neutral position, the winding wire 18 is in a leading position, and the winding wire 19 is in a trailing position. In the winding head zone 16 located between poles 4 and 5, the winding wires 17 and 19 cross. To the left of the pole 5, the winding wires in the pole zone 14 have the following positions: The winding wire 19 is in a neutral position, while the winding wire 17 is in a leading position and the winding wire 18 is in a trailing position. In the winding wire zone 15 associated with the pole 5, no crossing of the winding wires 17 through 19 takes place. To the right of the pole 5, the winding wire 19 is in a neutral position, the winding wire 18 is in a leading position, and the winding wire 17 is in a trailing position. In the winding head zone 16 that is located between the poles 5 and 6, crossing of the winding wires 18 and 19 does take place. To the left of the pole 6, the winding wires 17 through 19 in the pole zone 14 have the following positions: The winding wire 18 is in the neutral position, that is, the basic pole circumferential angle position. By comparison, because of the slot position, the winding wire 17 occupies a leading position, and the winding wire 19 occupies a trailing position. In the winding head zone 15 associated with the pole 6, no crossing of the winding wires 17 through 19 occurs. To the right of the pole 6, the winding wire 18 is in the neutral position, the winding wire 19 is in the leading position, and the winding wire 17 is in the trailing position. In the winding head zone 16 that follows the pole 6, crossing of the winding wires 17 and 18 does take place. This description can now be continued onward, namely for the winding segments b̄, c, d̄ and e, but the respective location and the respective crossing situation can also be found in the drawing. This is hereby referred to expressly.

If one looks at the overall situation in the winding segment a with regard to the winding parts 11, 12 and 13, which have the winding wires 17, 18 and 19, it can be found that in the region of the first circumference $U_1$ for each of the winding parts 11, 12 and 13, or in other words for each of the winding wires 17, 18 and 19, a leading position occurs four times, a neutral position occurs four times, and a trailing position occurs four times. Since this is true for each of the winding parts 11 through 13, because of the insertion of the winding wires 17 through 19 the same of windings is also always located on radially the same diameter, and the winding parts 11 through 13 are of equal length, with regard to the winding segment a in question, and thus balanced conditions result; that is, in each segment of the winding parts 11 through 13, in operation of the generator, a voltage of equal magnitude with the same phase relationship results, so that upon parallel connection of the winding parts 11 through 13, no compensatory currents flow.

If one looks at the winding segments b, c, d and e, then corresponding conditions can be found. As already noted, the phases 20 and 21 are wound in a corresponding way. It has moreover also been noted that the first five windings, in the winding segments a through e, are adjoined by a further five windings (not shown), which however are also embodied in accordance with the above description. Overall, the result is windings, each associated with a respective phase 10, 20 and 21, that each comprise three parallel-connected winding parts, and no circular currents or compensatory currents flow within the windings. The winding diagram shown and described therefore leads to an optimal electromagnetic embodiment, and in particular, the fewest possible crossings of the winding wires in the winding head zones take place.

Particularly in automatic winding production of the stator of a generator, the procedure is such that the winding is prepared flat; its length may amount to multiple times its circumference. The arrangement is preferably selected such that the respective groove is completely filled in its width by the thickness of the winding wire; that is, the wire width or wire diameter is equivalent to the groove width. The flat winding prepared by an assembly apparatus is then wound onto a mandrel, and with this tool it is driven axially into the stator assembly of the electrical machine. Next, by radial widening, the individual winding wires are introduced radially outward into the slots. Overall, the stator winding can thus be produced with simple means by machine in mass production. The parallel connection of the individual winding parts can already be done in the flat state of the winding, or after the winding has been placed in the slots of the electrical machines.

A winding with nine winding wires, with three winding wires connected in parallel for each of three phases, is especially preferred. This means a stator with 108 slots, 12 poles, and 60 windings.

As already described, no voltage differences should occur in the individual winding parts that are connected in parallel. For each wire length, each winding part must have the same number of windings in equivalent slots and must be located within one slot radially on the same diameter. In particular, it is provided that in a layered winding, in each layer, each winding wire changes slots; in the example with twelve poles, there are then twelve slots of the same phase relationship, or in other words slots numbered 1, 10, 19, 28, 37, 46, 55, 64, 73, 82, 91, and 100, so that the three winding wires, for instance, to be closed parallel within each winding layer are located equally often in an equivalent slot.

Many variations of the principle of the invention exist; various patterns result from various numbers of crossings in the winding head zones, and this is especially significant in terms of production feasibility.

It is especially significant that each winding path is located equally often in each slot; the rank of the slot, or in other words its respective circumferential angle position, must be taken into account in accordance with the above description. Moreover, the arrangement is made such that crossings in the winding head regions do not occur overly often, so as to keep the winding head dimensions small. It is of particular importance that as shown in FIG. 1, only six winding wire crossings within each winding part of one phase of a winding layer occur. From the production standpoint, the result is great symmetry. Variants that have more or fewer crossings are possible. Preferably, the winding wires are produced individually and can be placed in succession on a winding holder. For the (few) crossings, the wires can be especially shaped.

In the winding process, the procedure is preferably as follows: An individual winding wire comprises coils/waves of different widths in a fixed order. The various widths are dictated by the corresponding slot alternation (see FIG. 1). For production, it is advantageous to make at least two contrary bends in the wire simultaneously, so as not to have to rotate either the wire leads or the winding storage means. This provides suitability for flat wire of large cross section.

FIG. 2 shows a bending tool 33 to enable bending the winding wire; circles mark bending mandrels and rectangles mark steadiers. The bending tool 33 has one fixed part 30 and one carriage 31 that can be moved in distance-controlled fashion in the x and y directions. The moving part 31 does not execute a rotational motion. A bending mandrel A in an associated steadier GH are located on the fixed part 30. A bending mandrel B may also approach the various positions shown or be correspondingly shifted. This is equally true for the bending mandrel F. The bending mandrel E is in turn assigned a steadier GH. Moreover, by means of protrusions 32, a guiding and positioning device is created, to enable storing already-bent waves of suitable width. The device in FIG. 2 is the flattening device, which is used to produce the flat winding that will only later be wound up and then delivered radially to the slots of the electrical machine. The moving part 31 of the bending tool 33, as shown in FIG. 2, has bending mandrels C, D, G and H; the bending mandrels C and G approach the various positions shown there or can occupy them by being repositioned. The bending mandrels D and H are assigned steadiers GH. A wire lead DR is also provided. The winding wire is represented in FIG. 2 by a dotted line.

To be able to bend a wave of a winding wire, see the various sections $S_2$ through $S_6$ in FIGS. 3a, b. The bending mandrels and steadiers shown in FIGS. 3a, b correspond to the bending mandrels and steadiers with the same letters in FIG. 2. In step 1 in FIGS. 3a, b, it can be seen that a winding wire WD, represented by a solid line, is supplied as indicated by the arrow 34 and is held (clamped) between the bending mandrel A and an associated steadier GH. Moreover, a firm hold is effected between the bending mandrel D and the steadier GH associated with it. Next—in step $S_2$—the bending mandrel D with the steadier GH is moved in a spiral motion, represented by the arrow 35, around the bending mandrel A and a corresponding motion of the bending mandrel C with corresponding steadiers GH, and a double-bend form of the winding wire WD is created; that is, it is correspondingly bent in the region of the bending mandrel A and in the region of the bending mandrel D. In step $S_3$, a double-bend angling around the bending mandrels B and C is again performed; for that purpose, the bending mandrel C (and also the bending mandrel D) is shifted along a spiral path represented by arrow 36. The shifting motions represented by the arrows 35 and 36, which are also represented by dashed lines, are effected by suitable shifting of the part 31 relative to the part 30 of the bending tool 33. The bending operations around the bending mandrels A and D as well as around the bending mandrels B and C take place in each case simultaneously and in contrary motion. In step 4, a shifting of the bending mandrels H and G with corresponding steadiers GH is now effected along a spiral path that is identified by the arrow 37. Next, in step 5, a shifting of the bending mandrels G and H with corresponding steadiers GH is performed, in order to form the entire wave; this last motion likewise takes place on a spiral path and is identified by the arrow 38. The bends around the bending mandrels E and H and around F and G are effected in each case simultaneously and in contrary motion. A first wave of the winding wire WD has now been created. In step 6, reclamping is done and the steps are repeated, beginning with step $S_1$, to form the next wave. By means of suitable options for shifting the bending mandrels B, C, G and F, the corresponding mesh widths can be set, in order to attain the appropriate neutral, leading or trailing position of the wires in the region of the poles.

As already noted, the waves of the winding wire WD can be produced in five work steps ($S_1$ through $S_5$). The winding wire can be stamped in further work steps, in order to join the winding heads of the phases to one another and to join the first layer to the second layer. The crossing points within one phase can be especially shaped so that in terms of size they are not overly large. Preferably, round or flat wire is used for the winding wire. The procedure may also be such that a plurality of winding wires, extending parallel, are bent simultaneously.

The invention claimed is:

1. A method for producing a plurality of windings of several poles of an electrical machine that has a plurality of poles, comprising the steps of forming each of the windings by parallel-connected winding parts; associating at least one group of slots, associated with the winding parts, with each pole, and providing each motor-generator with a plurality of slots that have different circumferential angle positions with respect to the associated pole; forming equivalent slots by slots with a same circumferential angle position with respect to the associated pole; winding each winding part of the winding with an equal number of windings in equivalent slots; inserting only one winding of one phase with its winding parts into slots of only one group of slots and inserting another winding with its winding parts into other slots of only another group of slots; and extending winding wires of the winding parts in a winding head zone without crossing for every second winding head zone.

2. The method as defined by claim 1, further comprising providing each winding part with equally many windings on a radially identical diameter.

3. The method as defined by claim 1, further comprising providing the winding parts of the winding with equal length.

4. The method as defined by claim 1, further comprising providing equal number of windings in equivalent slots for each winding layer.

5. The method as defined by claim 1, further comprising providing a plurality of windings.

6. The method as defined by claim 1, further comprising forming one phase by each winding.

7. The method as defined by claim 1, further comprising preparing the winding and/or the winding parts flat and then converting to a curved form or wound-up form and finally placing into the slots of the electrical machine.

8. The method as defined by claim 1, further comprising forming the winding as a stator winding.

9. The method as defined by claim 1, further comprising making in the winding parts a change-from the slot of one rank to a slot of another rank in a respectively associated winding head.

* * * * *